United States Patent [19]

Tamura et al.

[11] Patent Number: 5,536,819
[45] Date of Patent: Jul. 16, 1996

[54] TRISAZO COMPOUNDS IMPARTING DEEP BLACK COLOR A METHOD FOR DYEING BY USING THEM AND AN INK CONTAINING THEM

[75] Inventors: Yuriko Tamura, Ibaraki; Kazuya Ogino, Minoo; Mahito Fujita, Ibaraki; Takashi Omura, Kobe; Hideo Kawashita, Minoo; Koji Aburada, Osaka, all of Japan

[73] Assignee: Sumitomo Chemical Company, Limited, Osaka, Japan

[21] Appl. No.: 246,601

[22] Filed: May 20, 1994

[30] Foreign Application Priority Data

May 31, 1993 [JP] Japan .................. 5-129146

[51] Int. Cl.$^6$ .............. C09B 35/46; C09D 11/00; D06P 1/39
[52] U.S. Cl. .............. 534/669; 534/680; 534/685; 8/437; 8/506; 8/673; 8/917; 8/918; 8/919; 8/924; 106/22 K
[58] Field of Search .................. 534/669, 680, 534/685; 106/22 K; 8/437, 506, 673, 917, 918, 919, 924

[56] References Cited

U.S. PATENT DOCUMENTS

| | | | |
|---|---|---|---|
| 5,152,801 | 10/1992 | Altermatt et al. | 8/436 |
| 5,171,848 | 12/1992 | Greenwood et al. | 534/680 |
| 5,180,817 | 1/1993 | Ogino et al. | 534/680 X |

FOREIGN PATENT DOCUMENTS 0408192  1/1991  European Pat. Off. .
0518266  12/1992  European Pat. Off. .

*Primary Examiner*—Fiona T. Powers
*Attorney, Agent, or Firm*—Watson Cole Stevens & Davis

[57] ABSTRACT

A trisazo compound represented by the following formula (I) in the free acid form:

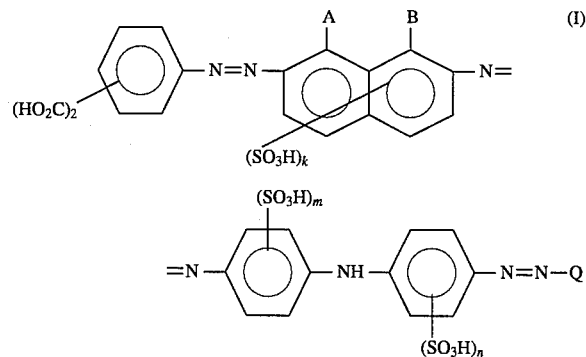

wherein Q is an phenyl or naphthyl group both of which may be unsubstituted or substituted; one of the A and B is hydroxy group and the other is amino group; K is 1 or 2; and one of m and n is 1 and the other is 0; a method for dyeing fiber materials, paper or leather by using the trisazo compounds and an ink containing the trisazo compounds, and the trisazo compound is excellent in solubility, and good in storage stability and free from clogging of nozzle caused by deposition. The ink using the trisazo compound gives a deep black-colored image excellent in clarity, water-durability and durability to light.

12 Claims, No Drawings

TRISAZO COMPOUNDS IMPARTING DEEP BLACK COLOR A METHOD FOR DYEING BY USING THEM AND AN INK CONTAINING THEM

The present invention relates to trisazo compounds and their use. More particularly, the present invention relate to trisazo compounds, a method for dyeing fiber materials, paper or leather by using the trisazo compounds and an ink containing the trisazo compounds.

Polyazo direct or acid dyes prepared from benzidine or its derivatives have hitherto been used for dyeing fiber materials having hydroxy or amino group. However, production of benzidine used as a starting material of these dyes is prohibited, and benzidine derivatives exemplified by o-tolidine and dianisidine are resistered as special chemical substances of which handling is restricted in production of these dyes, because of their toxicity. For such a reason, a variety of compounds have been proposed as non-benzidine type dyes. However, none of them have yet satisfied the requirements of users in the dye abilities.

C.I. Direct Black 168 represented by the following formula is also one proposed as a non-benzidine type dye.

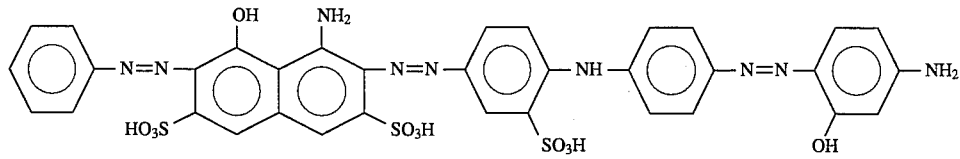

An ink containing the compound is mentioned in J 88-105079 A. However, if used for dyeing fiber materials or paper, it cannot give a deep black color because of inferiority in build-up property. Further, it is unsatisfactory in solubility as a dye for an ink and it gives a recording image having insufficient water-durability. Particularly when used as an ink for ink jet process, it causes clogging of nozzle due to deposition of dye and gives a recording image having insufficient water-durability. Thus, it is unsatisfactory from the view point of performances in any uses.

The inventors of the present invention have undertaken extensive studies for solving the above mentioned problem. As a result, compounds capable of satisfying the necessary conditions of a dye and an ink and producible without using benzidine nor its derivative as a starting material were found. Based on this finding, the present invention was accomplished.

The present invention provides a trisazo compound represented by the following formula (I) in the free acid form:

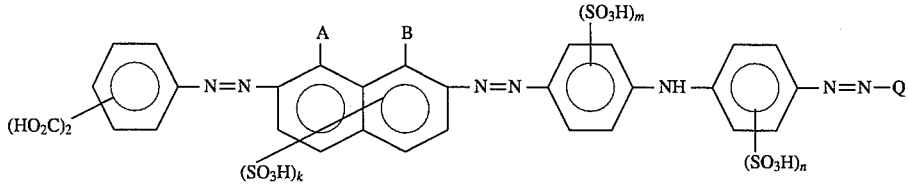

wherein Q is an phenyl or naphthyl group which may be substituted; one of the A and B is a hydroxy group and the other is an amino group; K is 1 or 2; and one of m and n is 1 and the other is 0.

The present invention also provides a method for dyeing fiber materials, paper or leather by using the trisazo compound represented by the formula (I) and an ink containing the trisazo compound.

When Q in the formula (I) is a phenyl group, the phenyl group is substituted or unsubstituted, though following (1) or (2) is preferable.

(1) A phenyl group which is substituted by one, two or three hydroxy groups and is further substituted by amino which may be unsubstituted or substituted, sulfo, alkyl, alkoxy or carboxy group.

(2) A phenyl group which is substituted by one or two amino groups which are unsubstituted or substituted, and may be further substituted by hydroxy, sulfo, alkyl, alkoxy or carboxy group.

The amino group as a substituent of the phenyl group may be unsubstituted, mono-substituted or di-substituted. The substituents of the amino group include methyl, ethyl, hydroxyethyl, cyanoethyl, acetyl, carbamoyl and the like. As the substituent of the phenyl group, the alkyl or alkoxy group may be one having 1 to 4 carbone atoms, such as methyl, ethyl, methoxy or ethoxy.

As the phenyl group denoted by Q in the formula (I), particularly preferable is 2-amino-4-hydroxyphenyl or 2-hydroxy-4-aminophenyl.

When Q in the formula (I) is a naphtyl group, the naphtyl group is substituted or unsubstituted, though following (1) or (2) is preferable.

(1) A naphtyl group which is substituted by one or two hydroxy groups and may be further substituted by amino which is unsubstituted or substituted, sulfo or carboxy group.

(2) A naphtyl group which is substituted by one or two amino groups which are unsubstituted or substituted and may be further substituted by hydroxy, sulfo or carboxy group.

The amino group as a subustituent of the naphtyl group may be unsubstituted, mono-substituted or di-substituted. The substituents of the amino group include methyl, ethyl, hydroxyethyl, cyanoethyl, acetyl, carbamoyl, phenyl, sulfophenyl, disulfophenyl, benzoyl and the like. In the case of above (1), the substituents of the amino group include, for example, methyl, acetyl, phenyl, sulfophenyl, disulfophenyl, benzoyl and the like. In the case of above (2), the substituents of the amino group include, for example, methyl, ethyl, hydroxyethyl, cyanoethyl, acetyl, carbamoyl or the like.

Among the trisazo compounds represented by the formula (I), preferable is a compound represented by the following formula (Ia) in the free acid form.

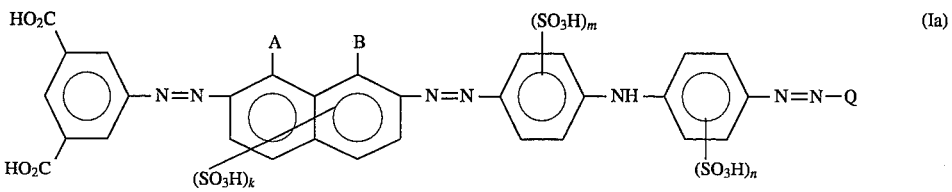

wherein Q, A, B, k, m and n are as defined above.

More preferable is the trisazo compound represented by the following formula (Ib) in the free acid form, which can be represented by the following formula (Ic) or (Id) in the free acid form, too:

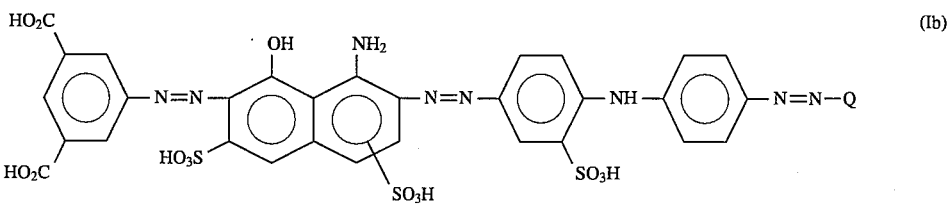

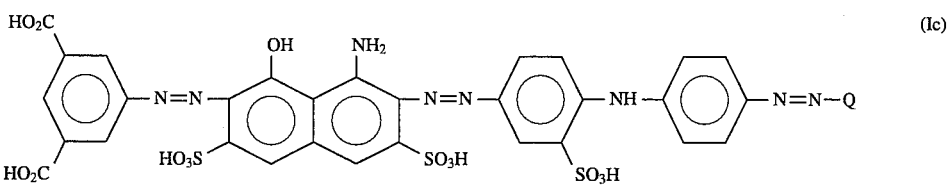

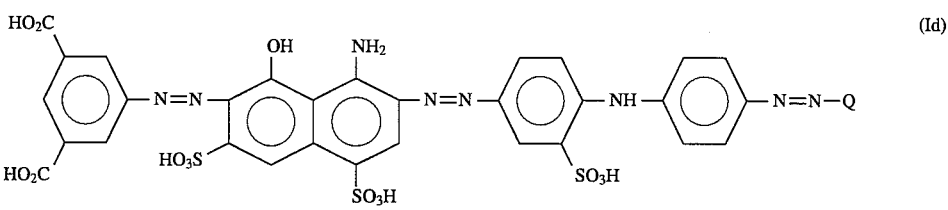

wherein Q is as defined above.

The trisazo compounds of the present invention are used either in the form of a free acid or in the form of a salt. Preferably, they are used in the form of an alkali metal salt, an ammonium salt or an organic amine salt. As the alkali metal to form the alkali metal salt, lithium, sodium, potassium or the like can be refered to. As the organic amine to form the organic amine salt, monoethanolamine, diethanolamine, triethanolamine or the like can be refered to.

The trisazo compounds represented by the formula (I) wherein A is hydroxy and B is amino can be produced, for example, in the following manner.

A diaminodiphenylamine compound represented by the following formula (II) in the free acid form

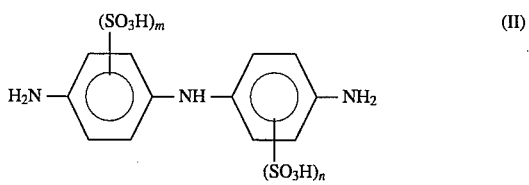

wherein m and n are as defined above, is tetrazotized in a usual manner. Then the tetrazotized compound is coupled with an aminonaphthol compound represented by the following formula (III) in the free acid form

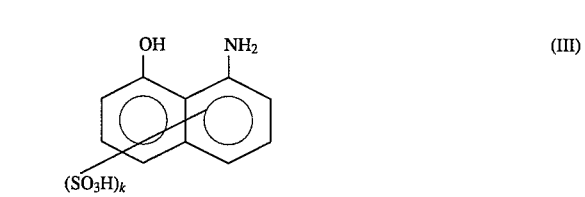

wherein k is as defined above, in an aqueous medium under an acidic condition to obtain a monoazodiazonium compound. The monoazodiazonium compound thus obtained is coupled with a diazonium compound in a weekly acidic, neutral or weekly alkaline aqueous medium, the diazonium compound being prepared by diazotizing a dicarboxyaniline represented by the following formula (IV) in a usual manner.

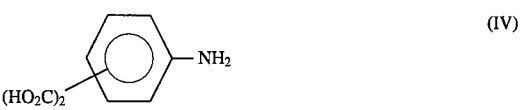

(F)

The resulting compound is coupled with a compound represented by the following formula (V)

wherein Q is as defined above, in a weekly acidic, neutral or weekly alkaline aqueous medium to obtain the trisazo compounds represented by the formula (I) wherein A is a hydroxy group and B is an amino group.

The trisazo compounds represented by the formula (I) wherein A is amino and B is hydroxy can be produced, for example, in the following manner.

The dicarboxyaniline represented by the formula (IV) in the free acid form is diazotized in a usual manner and the resulting diazonium compound is coupled with an aminonaphthol compound represented by the formula (III) in the free acid form in an aqueous medium under an acidic condition to obtain a monoazo compound. Then the monoazo compound is coupled with a tetrazo compound in a weekly acidic, neutral or weekly alkaline aqueous medium, the tetrazo compound being prepared by a tetrazotization of the diaminodiphenylamine compound represented by the formula (II) in the free acid form in a usual manner. The resulting compound is coupled with a compound represented by the formula (V) in a weekly acidic, neutral or weekly alkaline aqueous medium to obtain the trisazo compounds represented by the formula (I) wherein A is amino and B is hydroxy.

Examples of the aminonaphthol compound represented by the formula (III) include 1-amino-8-naphthol- 4-sulfonic acid, 1-amino-8-naphthol-3,6-disulfonic, 1-amino-8-naphthol-4,6-disulfonic acid and the like.

Examples of the dicarboxyaniline represented by the formula (IV) include 3-aminophthalic acid, 4-aminophthalic acid, 2-aminoisophthalic acid, 4-aminoisophthalic acid, 5-aminoisophthalic acid, 2-aminoterephthalic acid and the like. Among them, 5-aminoisophthalic acid is preferable.

The compound represented by the formula (V) may be a substituted or unsubstituted benzene or a substituted or unsubstituted naphthalene. As the example of the compound represented by the formula (V), aniline or its derivative, phenol or its derivative, amino phenol or its derivative, naphthol or its derivative, naphthoic acid or its derivative, naphthilamine sulfonic acid or its derivative, naphthol sulfonic acid or its derivative, or the like can be referred to.

Among them, phenol, o-, m- or p-cresol, resorcinol, phloroglucinol, m-methoxyphenol, m-amonophenol, 3-(diethylamino)phenol, 5-amino-2-methylphenol, 3-[bis(β-hydroxyethyl)amino] phenol, N,N-bis(β-hydroxyethyl)aniline, 1,3-diamino-4-methylbenzene, salicylic acid, 1,3-diaminobenzene-4-sulfonic acid, 1-acetylamino4-methoxy-3-[bis(β-hydroxyethyl)amino]benzene, 1-naphthol, 1-hydroxy-2-naphthoic acid, 1-naphthol-4-sulfonic acid, 1-naphthol-5-sulfonic acid, 1-naphthol-3-sulfonic acid, 1-naphthol-3,8-disulfonic acid, 1-naphthol- 3,6-disulfonic acid, 1-naphthol-3,6,8-trisulfonic acid, 2-naphthol, 3-hydroxy-2-naphthoic acid, 2-naphthol-8-sulfonic acid, 2-naphthol-7-sulfonic acid, 2-naphthol-6-sulfonic acid, 2-naphthol-6,8-disulfonic acid, 2-naphthol-3,6-disulfonic acid, 1-aminonaphthalene-6-sulfonic acid, 1-aminonaphthalene-7-sulfonic acid, 2-aminonaphthalene-6-sulfonic acid, 2-amino-8-hydroxynaphthalene-6-sulfonic acid, 2-methylamino- 8-hydroxynaphthalene-6-sulfonic acid, 2-ethylamino- 8-hydroxynaphthalene-6-sulfonic acid, 2-acetylamino- 8-hydroxynaphthalene-6-sulfonic acid, 2-propionylamino- 8-hydroxynaphthalene-6-sulfonic acid, 2-benzoylamino- 8-hydroxynaphthalene-6-sulfonic acid, 2-carbamoylamino- 8-hydroxynaphthalene-6-sulfonic acid, 2-sulfamoylamino- 8-hydroxynaphthalene-6-sulfonic acid, 2-phenylamino- 8-hydroxynaphthalene-6-sulfonic acid, 3-amino- 8-hydroxynaphthalene-6-sulfonic acid, 3-methylamino- 8-hydroxynaphthalene-6-sulfonic acid, 3-ethylamino- 8-hydroxynaphthalene-6-sulfonic acid, 3-acetylamino- 8-hydroxynaphthalene-6-sulfonic acid, 3-propionylamino- 8-hydroxynaphthalene-6-sulfonic acid, 3-benzoylamino- 8-hydroxynaphthalene-6-sulfonic acid, 3-carbamoylamino- 8-hydroxynaphthalene-6-sulfonic acid, 3-sulfamoylamino- 8-hydroxynaphthalene-6-sulfonic acid, 3-phenylamino- 8-hydroxynaphthalene-6-sulfonic acid, 1-amino-8-hydroxynaphthalene-3,6-disulfonic acid, 1-acetylamino- 8-hydroxynaphthalene-3,6-disulfonic acid, 1-amino-8-hydroxynaphthalene-4,6-disulfonic acid, 1-acetylamino- 8-hydroxynaphthalene-4,6disulfonic acid, 1-amino-8-hydroxynaphthalene-2,4-disulfonic acid, 1,8-dihydroxynaphthalene-3,6-disulfonic acid or the like can be preferably used. Particularly preferable is m-aminophenol.

The trisazo compound of the present invention is usable either singly or in the form of a mixture for dyeing and printing fiber materials having a hydroxy and/or an amino group, paper and leather. It is particularly useful for dyeing and printing cellulose fiber such as rayon or cotton, paper, leather, silk, synthetic polyamide and the like.

The dyeing can be carried out by various dyeing process such as exhaustion dyeing process. Since the trisazo compound of the present invention exhibits a good solubility as well as a high fixation property, it can give a deep black colored dyed product. Particularly when used for dyeing paper, it exhibits a good build-up property and gives a dyed product of excellent fastness.

Further the trisazo compound of the present invention is usable either singly or in the form of a mixture as a dye for an ink applicable to an ink jet printer utilizing piezoelectric vibrator or thermal energy. Further, if necessary, it can be used in combination with a compound conventionally used for the ink jet process which includes known dyes such as C.I. direct black 154, and the like.

As an ink, an aqueous ink, which is a composition comprising a water-soluble organic solvent and water, is particularly suitable. As the example of the water-soluble organic solvent usable for the aqueous ink, C1–C4 alkanols such as methanol, ethanol, n-propanol, isopropanol, n-butanol, sec-butanol, tert-butanol or iso-butanol; amides such as dimethylformamide or diethylformamide; ketones or ketone alcohols such as acetone or diacetonealcohol; ethers such as tetrahydrofuran or dioxane; polyalkylene glycols such as polyethylene glycol or polypropylene glycol; alkylene glycols or thioglycols having $C_2$–$C_6$ alkylene such as ethylene glycol, propylene glycol, butylene glycol, triethylene glycol, thioglycol, hexylene glycol or diethylene glycol; other polyols such as glycerol or 1,2,6-hexanetriol; lower alkyl ethers of polyhydric alcohols such as 2-methoxy ethanol, 2-(2-methoxyethoxy)-ethanol, 2-ethoxy ethanol, 2-[2-(2-methoxyethoxy)-ethoxy]ethanol or 2-[2-(2-ethoxyethoxy)ethoxy]ethanol; alkanol amines such as monoethanol amine, diethanolamine or triethanolamine; or N-containing heterocyclic ketones such as 2-pyrrolidone, N-methyl-2-pyrrolidone or 1,3-dimethyl- 2-imidazolidinone can be referred to. The water-soluble organic solvent can be used either singly or in the form of a mixture of two or more as long as they cause no adverse influence one another.

When the trisazo compound represented by the formula (I) is used for an ink, the amount of the trisazo compound added into the ink is usually from 0.5 to 20 parts by weight in 100 parts by weight of the ink, and preferably from 1 to 15 parts.

To the aqueous ink, may be added a rotproofing or mildewproofing agent such as sodium dehydroacetate as well as other various additives such as ultraviolet absorber, infrared red absorber, viscosity regulator, surface tension regulator, pH regulator, resistivity regulator, penetrant or the like.

The aqueous ink can be easily prepared by dissolving the trisazo compound represented by the formula (I), a water-soluble organic solvent and various additives into cold or warm water and, without cooling or after cooling, filtering the resulting solution through a membrane filter having very fine pore size.

The trisazo compound of the present invention is excellent in solubility. Accordingly it is good in storage stability and free from clogging of nozzle caused by deposition. Further the ink using the trisazo compound of the present invention gives a deep black-colored image excellent in clarity, water-durability and durability to light.

The present invention is now illustrated in more detail by the following examples, which are only illustrative and never to limit the invention. In the examples, "part" means "part" by weight.

EXAMPLE 1

27.9 Parts of 4-4'-diaminodiphenylamine-2-sulfonic acid was tetrazotized in a conventional manner and the tetrazo compound thus obtained was coupled with 31.9 parts of 1-amino-8-naphthol-3,6-disulfonic acid at 0°–5° C. under acidic condition. Then, a diazonium compound prepared by diazotizing 18.1 parts of 5-aminoisophthalic acid in a conventional manner was added thereinto and coupling reaction was carried out at 0°–10° C. under a weekly acidic condition. Thereafter 10.9 parts of m-aminophenol was further added thereinto and coupling reaction was completed under a weekly acidic condition. Then the resulting product was salted out and isolated in a conventional manner to obtain a trisazo compound represented by the following formula in the free acid form. Measured in an aqueous medium, $\lambda_{max}$ of this trisazo compound was 620 nm.

column of the following Table 1 and compounds of the formula (V) shown in the third column of the following Table 1, respectively, to obtain trisazo compounds. Then, Example 3 was repeated, except that the trisazo compound obtained in Example 1 was replaced with the trisazo compound prepared in this example to obtain dyeing products having color tones shown in the fourth column of the following Table 1.

TABLE 1

| No. | Compound of formula (IV) | Compound of formula (V) | Color tones |
|---|---|---|---|
| 1 | 5-amino-isophthalic acid | resolcinol | Greenish black |
| 2 | 5-amino-isophthalic acid | phloroglucinol | Bluish black |
| 3 | 5-amino-isophthalic acid | 3-(diethyl-amino)phenol | Black tinged with violet |
| 4 | 5-amino-isophthalic acid | salicylic acid | Greenish black |
| 5 | 5-amino-isophthalic acid | 1-hydroxy-2-naphthoic acid | Greenish black |
| 6 | 5-amino- | 3-hydroxy-2- | Bluish |

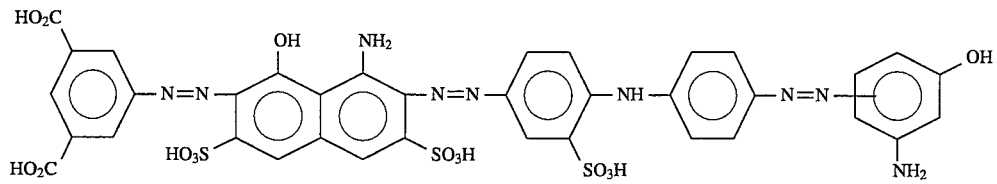

EXAMPLE 2

Example 1 was repeated, except that 5-aminoisophthalic acid used in Example 1 was replaced with 4-aminophthalic acid to obtain a trisazo compound represented by the following formula. Measured in an aqueous medium, $\lambda_{max}$ of this trisazo compound was 615 nm.

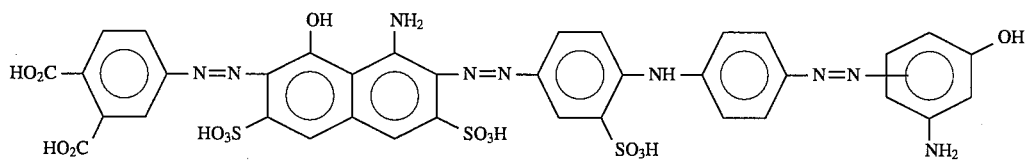

EXAMPLE 3

Into 500 parts of an LBKP 20 g/L pulp dispersion having been beaten up to a degree of beating of CFS 400 ml, 0.8 part of the trisazo compound obtained in Example 1 was added. After agitating the mixture for 10 minutes, 0.3 part of Sizepine E (sizing agent manufactured by Arakawa Chemical Industry, Co.) was added and the resulting mixture was agitated for 10 minutes. Thereafter, 0.3 part of crystalline aluminum sulfate was added thereinto, the resulting mixture was agitated for 10 minutes to carry out dyeing. Then, the dyed pulp was made into paper and dried. The paper thus prepared had a deep black color tone and an excellent fastness.

EXAMPLE 4

Example 1 was repeated, except that 5-aminoisophthalic acid and m-aminophenol used in Example 1 were replaced with compounds of the formula (IV) shown in the second TABLE 1-continued

| No. | Compound of formula (IV) | Compound of formula (V) | Color tones |
|---|---|---|---|
|  | isophthalic acid | naphthoic acid | black |
| 7 | 5-amino-isophthalic acid | 1-naphthol-3-sulfonic acid | Bluish black |
| 8 | 5-amino-isophthalic acid | 1-amino-naphthalene-7-sulfonic acid | Black tinged with violet |
| 9 | 5-amino-isophthalic acid | 1-amino-naphthalene-6-sulfonic acid | Black tinged with violet |
| 10 | 4-amino-phthalic acid | m-amonophenol | Black |
| 11 | 4-amino-phthalic acid | 5-amino-2-methylphenol | Black |
| 12 | 4-amino-phthalic acid | 3-amino-8-hydroxy-naphthalene-6- | Black tinged with violet |

TABLE 1-continued

| No. | Compound of formula (IV) | Compound of formula (V) | Color tones |
|---|---|---|---|
| 13 | 3-amino-phthalic acid | sulfonic acid m-amonophenol | Black |
| 14 | 3-amino-phthalic acid | 1,3-diamino-benzene-4-sulfonic acid | Greenish black |
| 15 | 4-amino-isophthalic acid | m-amonophenol | Black |
| 16 | 4-amino-isophthalic acid | 2-amino-naphthalene-6-sulfonic acid | Black tinged with violet |
| 17 | 2-amino-isophthalic acid | m-amonophenol | Black |
| 18 | 2-amino-isophthalic acid | phenol | Greenish black |
| 19 | 2-amino-terephthalic acid | m-amonophenol | Black |

EXAMPLE 5

Example 1 was repeated, except that 1-amino- 8-naphthol-3,6-disulfonic acid used in Example 1 was replaced with 1-amino-8-naphthol-4,6-disulfonic acid to obtain a trisazo compound represented by the following formula in the free acid form. Measured in an aqueous medium, $\lambda_{max}$ of this trisazo compound was 610 nm.

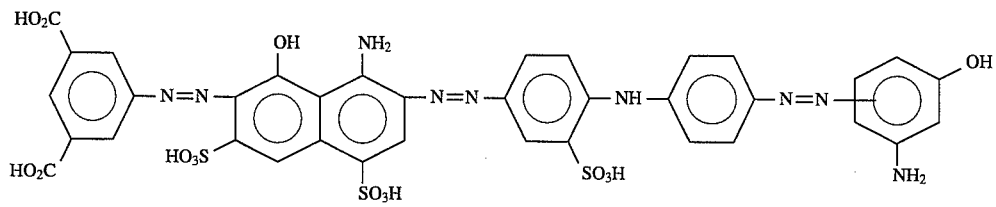

EXAMPLE 6

Example 5 was repeated, except that 5-aminoisophthalic acid and m-aminophenol used in Example 5 were replaced with compounds of the formula (IV) shown in the second column of the following Table 2 and compounds of the formula (V) shown in the third column of the Table 2, respectively, to obtain trisazo compounds. Then, Example 3 was repeated, except that the trisazo compound obtained in Example 1 was replaced with the trisazo compound prepared in this example to obtain dyeing products having color tones shown in the fourth column of the following Table 2.

TABLE 2

| No. | Compound of formula (IV) | Compound of formula (V) | Color tones |
|---|---|---|---|
| 1 | 5-amino-isophthalic acid | resolcinol | Greenish black |
| 2 | 5-amino-isophthalic acid | 5-amino-2-methylphenol | Black |
| 3 | 5-amino-isophthalic acid | 1-hydroxy-2-naphthoic acid | Greenish black |
| 4 | 5-amino-isophthalic acid | 1-amino-naphthalene-7-sulfonic acid | Black tinged with violet |
| 5 | 5-amino-isophthalic acid | 1-amino-naphthalene-6-sulfonic acid | Black tinged with violet |
| 6 | 4-amino-phthalic acid | m-amonophenol | Black |
| 7 | 4-amino-phthalic acid | 1-naphthol-3-sulfonic acid | Bluish black |
| 8 | 4-amino-phthalic acid | 3-hydroxy-2-naphthoic acid | Bluish black |

EXAMPLE 7

A composition of the following formulation was heated at about 50° C. with agitation to form a solution. Then the solution was filtered through a Teflon filter having a pore diameter of 0.45 μm to prepare an ink.

| | |
|---|---|
| Trisazo compound obtained in Example 1 | 5 parts |
| Deionized water | 90 parts |
| Diethylene glycol | 5 parts |
| Sodium dehydroacetate | 0.05 part |

The ink thus prepared was sealed in a glass container and left standing for a long period of time at temperatures of 20° C. or 50° C. After standing, the recording liquid showed no deposition of crystalline matter and demonstrated a high stability of its quality. Using the ink thus obtained, an ink jet recording was carried out on a commercially available high quality paper by a recording apparatus equipped with an On-Demand type recording head which discharges ink by a piezoelectric vibrator. No clogging of nozzle took place even after the recording for a long period of time. The image thus formed was excellent in water-durability, light durability, color depth and clarity.

EXAMPLE 8

An ink was prepared from a composition of the following formulation by the same procedure as in Example 7.

| | |
|---|---|
| Compound obtained in No. 4 of Example 6 | 3 parts |
| Deionized water | 84 parts |
| Diethylene glycol | 10 parts |
| Glycerin | 3 parts |
| Sodium dehydroacetate | 0.05 part |

Using the ink thus obtained, an ink jet recording was carried out by the same procedure as in Example 7.

The result similar to that in Example 7 was obtained.

EXAMPLE 9

A composition of the following formulation was heated at about 50° C. with agitation to form a solution. Then the solution was filtered through a Teflon filter having a pore diameter of 0.45 μm to prepare an ink.

| Trisazo compound obtained in Example 5 | 5 parts |
| --- | --- |
| Deionized water | 90 parts |
| Diethylene glycol | 5 parts |
| Sodium dehydroacetate | 0.05 part |

The ink thus prepared was sealed in a glass container and left standing for a long period of time at temperatures of 20° C. or 50° C. After standing, the ink showed no deposition of crystalline matter and demonstrated a high stability of its quality. Using the ink thus obtained, an ink jet recording was carried out on a commercially available high quality paper by a so-called bubble jet type recording apparatus which discharges ink by the action of thermal energy. No clogging of nozzle took place even after the recording for a long period of time. The image thus formed was excellent in water-durability, light durability, color depth and clarity.

EXAMPLE 10

An ink was prepared from a composition of the following formulation by the same procedure as in Example 9.

| Compound obtained in No. 1 of Example 4 | 3 parts |
| --- | --- |
| Deionized water | 84 parts |
| Diethylene glycol | 10 parts |
| Glycerin | 3 parts |
| Sodium dehydroacetate | 0.05 part |

Using the ink thus obtained, an ink jet recording was carried out by the same procedure as in Example 9. The result similar to that in Example 9 was obtained.

The trisazo compound of the present invention is excellent in solubility. Using the trisazo compound for dyeing or printing, a clear and deep colored dyeing product or recording image having excellent water-durability and light durability can be obtained. Thus, the trisazo compound of the present invention exhibits various excellent properties as a dye for dyeing and ink.

What we claim are:

1. A trisazo compound represented by the following formula (I)

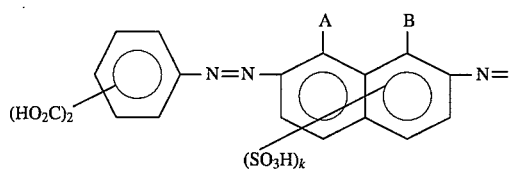

-continued

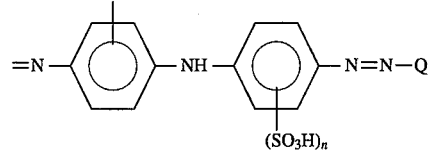

wherein Q is a phenyl or naphthyl group which may be substituted; one of the A and B is a hydroxy group and the other is an amino group; K is 1 or 2; and one of m and n is 1 and the other is 0; or a salt thereof.

2. The trisazo compound according to claim 1 wherein Q is a phenyl group which is substituted by one, two or three hydroxy groups and may be further substituted by an amino group which may be substituted or a sulfo, alkyl, alkoxy or carboxy group.

3. The trisazo compound according to claim 1 wherein Q is a phenyl group which is substituted by one or two amino groups which may be substituted and the phenyl group may be further substituted by a hydroxy, sulfo, alkyl, alkoxy or carboxy group.

4. The trisazo compound according to claim 1 wherein Q is 2-amino-4-hydroxyphenyl or 2-hydroxy-4-aminophenyl.

5. The trisazo compound according to claim 1 wherein Q is a naphthyl group which is substituted by one or two hydroxy groups and may be further substituted by an amino group which may be substituted, a sulfo or carboxy group.

6. The trisazo compound according to claim 1 wherein Q is a naphthyl group which is substituted by one or two amino groups which may be substituted and the naphthyl group may be further substituted by a hydroxy, sulfo or carboxy group.

7. The trisazo compound according to claim 1 which is represented by the following formula (Ia) in the free acid form:

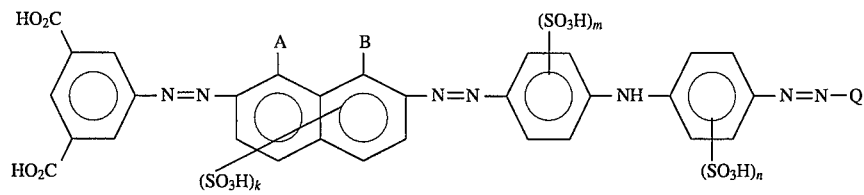

wherein Q, A, B, k, m and n are as defined in the formula (I).

8. The trisazo compound according to claim 7 which is represented by the following formula (Ic) in the free acid form:

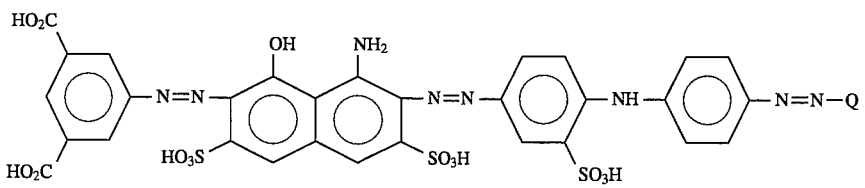

(Ic)

wherein Q is as defined in the formula (I).

9. The trisazo compound according to claim 7 which is represented by the following formula (Id) in the free acid form:

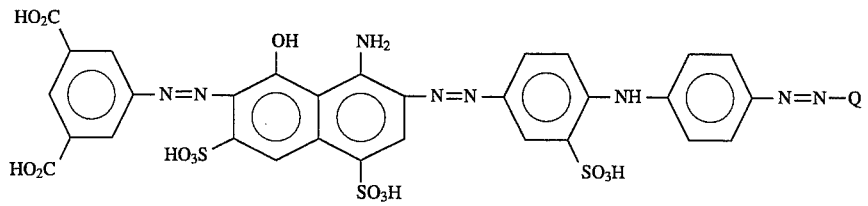

(Id)

wherein Q is as defined in the formula (I).

10. A method for dyeing fiber materials, paper or leather, by contacting the material to be dyed with the trisazo compound according to claim 1.

11. An ink which contains the trisazo compound according to claim 1.

12. A method for ink jet recording which comprises passing the ink of claim 11 through a nozzle onto a substrate.

* * * * *